United States Patent
Wang et al.

(10) Patent No.: US 10,218,846 B2
(45) Date of Patent: Feb. 26, 2019

(54) CALL PROCESSING METHOD AND DEVICE (71) Applicant: Xiaomi Inc., Beijing (CN)

(72) Inventors: Guangjian Wang, Beijing (CN); Long Pan, Beijing (CN); Yixing Zou, Beijing (CN)

(73) Assignee: XIAOMI INC., Beijing (CN)

( * ) Notice: Subject to any disclaimer, the term of this patent is extended or adjusted under 35 U.S.C. 154(b) by 0 days.

(21) Appl. No.: 15/229,134

(22) Filed: Aug. 5, 2016

(65) Prior Publication Data

US 2017/0126889 A1    May 4, 2017

(30) Foreign Application Priority Data

Oct. 29, 2015    (CN) .......................... 2015 1 0724716

(51) Int. Cl.
*H04M 3/42*    (2006.01)
*H04M 3/436*    (2006.01)
*H04M 1/2745*    (2006.01)

(52) U.S. Cl.
CPC ......... *H04M 3/436* (2013.01); *H04M 1/2745* (2013.01); *H04M 3/42059* (2013.01); *H04M 2201/12* (2013.01); *H04M 2201/14* (2013.01); *H04M 2203/2005* (2013.01); *H04M 2203/551* (2013.01); *H04M 2250/60* (2013.01)

(58) Field of Classification Search
CPC ............................ H04M 3/436; H04M 1/2745
USPC ............................ 379/210.01, 211.01, 212.01
See application file for complete search history.

(56) References Cited

U.S. PATENT DOCUMENTS

| 5,566,234 A | * | 10/1996 | Reed | H04M 15/00 379/145 |
| 6,198,812 B1 | * | 3/2001 | Weber | H04M 1/663 379/142.04 |
| 9,553,980 B1 | * | 1/2017 | Devitt | H04M 3/42042 |
| 9,686,393 B1 | * | 6/2017 | Cai | H04M 1/575 |
| 2010/0197275 A1 | | 8/2010 | Yamasaki | |
| 2011/0280160 A1 | | 11/2011 | Yang | |
| 2017/0126874 A1 | * | 5/2017 | Cai | H04M 1/663 |

FOREIGN PATENT DOCUMENTS

| CN | 101827367 A | 9/2010 |
| CN | 103152739 A | 6/2013 |
| CN | 104038612 A | 9/2014 |
| CN | 104243661 A | 12/2014 |
| CN | 104394259 A | 3/2015 |

(Continued)

OTHER PUBLICATIONS

Office action from EPO dated Mar. 3, 2017 for European Application No. 16185324.

(Continued)

*Primary Examiner* — William Deane, Jr.
(74) *Attorney, Agent, or Firm* — Jun He Law Offices P.C.; James J. Zhu (57) ABSTRACT The present disclosure relates to a call processing method and device. The method includes: obtaining usage information of a terminal device when receiving a call request from a strange call; determining whether the usage information comprises usage information associated with the strange call; and not intercepting the strange call if the usage information comprises the usage information associated with the strange call.

15 Claims, 2 Drawing Sheets (56) References Cited

FOREIGN PATENT DOCUMENTS

| CN | 104601782 A | 5/2015 |
|---|---|---|
| CN | 104954531 A | 9/2015 |
| JP | 2011166574 A | 8/2011 |
| JP | 2013026632 A | 2/2013 |
| JP | 2014126914 A | 7/2014 |
| WO | 2008031871 A1 | 3/2008 |
| WO | 2009092061 A1 | 7/2009 |

OTHER PUBLICATIONS

International search report and written opinion dated Jul. 21, 2016.
Office action from JPO for JP application 2016544457 and corresponding English Translation, dated Jan. 23, 2018.
Office Action in Chinese application No. 201510724716.0, dated Feb. 2, 2018.
Translation of the Office Action in Chinese application No. 201510724716.0 dated Feb. 2, 2018.

* cited by examiner

Fig. 4

CALL PROCESSING METHOD AND DEVICE

CROSS-REFERENCE TO RELATED APPLICATIONS

This application is based on and claims priority to Chinese Patent Application Serial No. 201510724716.0, filed with the State Intellectual Property Office of P. R. China on Oct. 29, 2015, the entire content of which is incorporated herein by reference.

TECHNICAL FIELD

The present disclosure relates to communication technology field, and more particularly to a call processing method and device.

BACKGROUND

The phone call is one of the most common and oldest instant communication methods. As a development of communication technology, phones have become a necessity for daily life, and thus many people prompt products to the users or cheat money from the users via the phones, which brings unnecessary troubles to the user's daily life. Thus, there is a need to intercept this kind of calls, to avoid the unfavorable impact on the user's daily life.

In the related art, the call processing method may be intercepting a call from a strange number. That is, when a call number does not belong to the address book, the call number is intercepted. However, when the user orders take-out food or submits other purchase orders via the phone number of the terminal device, a call request from a strange number may be received in a short time, and if the above call processing method is used to process this call, the call from a product deliveryman may be missed, which reduces the communication efficiency, and cannot satisfy the normal communication demand of the user.

SUMMARY

In order to solve problems in the related art, the present disclosure provides a call processing method and device.

According to embodiments of a first aspect of the present disclosure, a call processing method is provided. The method includes: obtaining usage information of a terminal device when receiving a call request from a stranger call; determining whether the usage information comprises usage information associated with the stranger call; and not intercepting the stranger call if the usage information comprises the usage information associated with the stranger call.

According to embodiments of a second aspect of the present disclosure, a call processing device is provided. The device includes: a processor; and a memory, configured to store instructions executable by the processor. The processor is configured to: obtain usage information of a terminal device when receiving a call request from a stranger call; determine whether the usage information comprises usage information associated with the stranger call; and not intercept the stranger call if the usage information comprises the usage information associated with the stranger call.

It should be understood that, the above general description and following detail description are exemplary and explanatory, and shall not be construed to limit the present disclosure.

BRIEF DESCRIPTION OF THE DRAWINGS

The accompanying drawings herein, which are incorporated in and constitute a part of this specification, illustrate embodiments consistent with the invention. These accompanying drawings, together with the description, serve to explain the principles of the invention.

DETAILED DESCRIPTION

In order to make objectives, technical solutions and advantages of the present disclosure clearer, implementations of the present disclosure will be described in detail below with reference to drawings.

Reference will now be made in detail to exemplary embodiments, examples of which are illustrated in the accompanying drawings. The following description refers to the accompanying drawings in which the same numbers in different drawings represent the same or similar elements unless otherwise represented. The implementations set forth in the following description of exemplary embodiments do not represent all implementations consistent with the invention. Instead, they are merely examples of apparatuses and methods consistent with aspects related to the invention as recited in the appended claims.

Figure 1:
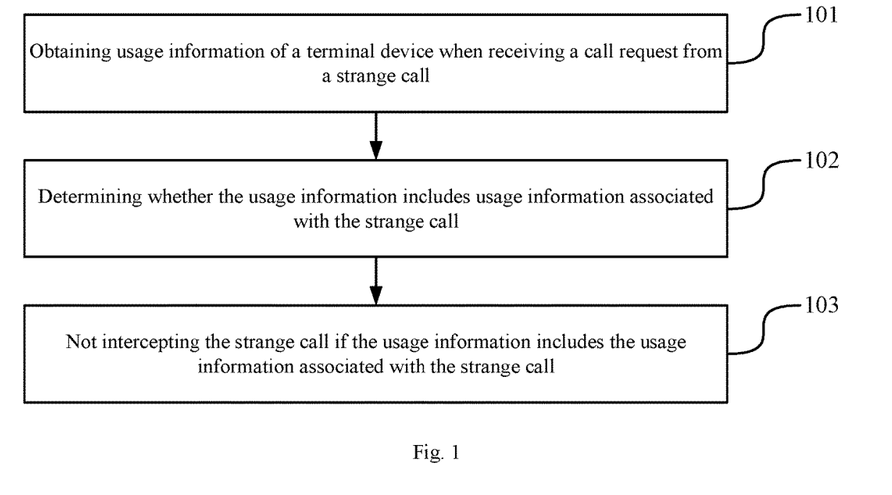
FIG. 1 is a flow chart of a call processing method according to an exemplary embodiment of the present disclosure.

FIG. 1 is a flow chart of a call processing method according to an exemplary embodiment of the present disclosure. As illustrated in FIG. 1, the call processing method is used in a terminal device, and includes steps as follows:

In step 101, usage information of the terminal device is obtained when a call request is received from a strange number.

In step 102, it is determined whether the usage information includes usage information associated with the strange calls.

In step 103, the strange call is not intercepted if the usage information includes usage information associated with the strange call.

With the method provided by embodiments of the present disclosure, by determining whether the usage information of the terminal device includes user trading information on a specified client or a specified call record associated with the strange call, it is possible to determine whether the strange call is desired or needed to be answered by the user of the terminal device, thereby achieving the control on intercepting the strange calls, avoiding missed calls efficiently, further improving the communication efficiency, and satisfying the normal communication demand of the users.

In the first aspect of the present disclosure, a first implementation to determine whether the usage information comprises usage information associated with the strange calls includes: determining whether client usage information of the terminal device comprises user trading information on a specified client, in which the user trading information is newly added within a first preset period. Alternatively, the first implementation includes: determining whether history call information of the terminal device comprises a specified call record associated with the strange call. The specified call record comprises a calling record, a called record having a number of calls exceeding a preset number, or a call record having call duration exceeding preset duration.

In a second possible implementation of the first aspect of the present disclosure, if the usage information comprises the usage information associated with the strange call, the strange call would not be intercepted, which includes: not intercepting the strange call within a second preset period, if the usage information comprises the usage information associated with the strange call.

In a third possible implementation of the first aspect of the present disclosure, before obtaining the usage information of the terminal device, the method further includes: detecting whether a first interception function is in an opening state; detecting whether a second interception function is in an opening state when the first interception function is in the opening state; and triggering the process of obtaining the usage information of the terminal device when the second interception function is in the opening state.

In a fourth possible implementation of the first aspect of the present disclosure, not to intercept the strange call includes: detecting whether a first interception function is in an opening state, and displaying a first reminder message of whether to close the first interception function on a current interface of the terminal device if the first interception function is in the opening state. Alternatively, the fourth implementation includes: detecting whether a first interception function is in an opening state, displaying a second reminder message of whether to start a second interception function on the current interface of the terminal device if the first interception function is in the opening state, and controlling the first interception function not to intercept the strange call after starting the second interception function.

The above alternative technical solutions may be combined in any way to form alternative embodiments of the present disclosure, which will not be elaborated herein.

Figure 2:
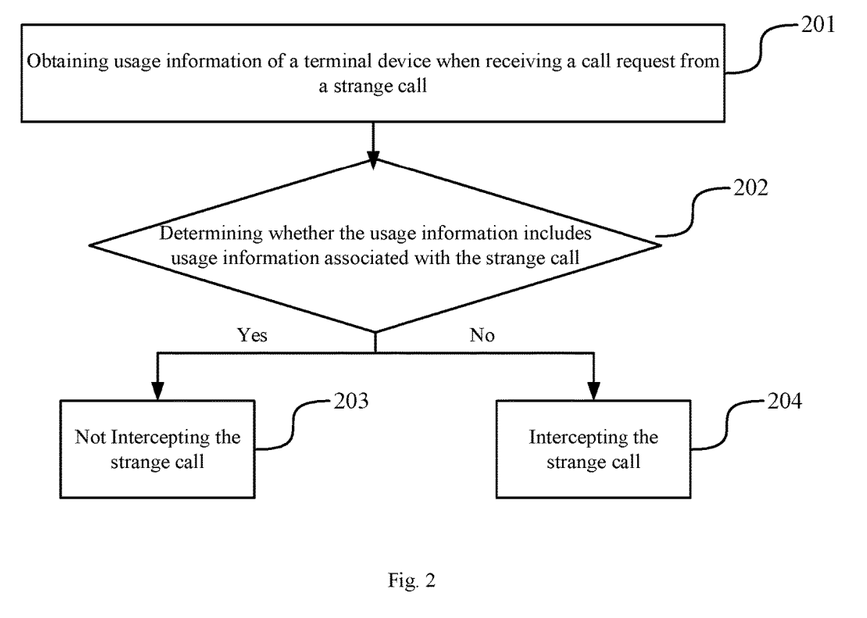
FIG. 2 is a flow chart of a call processing method according to another exemplary embodiment of the present disclosure.

FIG. 2 is a flow chart of a call processing method according to an exemplary embodiment of the present disclosure. The executive body of this embodiment is the terminal device, and as illustrated in FIG. 2, this embodiment includes following steps:

In step 201, usage information of the terminal device is obtained when a call request is received from a strange call.

In order to avoid unnecessary interruptions, call interception has become a common function of the terminal device. At present, principles of call interception include strange number interception, all-number interception and blacklist interception, etc. However, when the user opens the strange number interception or the all-number interception, he/she may miss necessary calls, for example, calls from deliverymen. In order to avoid missing necessary calls, the present disclosure provides a method that further determines whether to intercept a call according to the usage information of the terminal device, based on the above interception principles.

The strange call is a call from a phone number not stored in the address book. Whether the current call is a strange call may be determined as follows: The phone number of the current call is obtained, and then it is determined whether the phone number is stored in the address book. If the phone number is not stored in the address book, it is determined that the current call is a strange call, and if the phone number is stored in the address book, it is determined that the current call is not a strange call.

The usage information of the terminal device at least includes client usage information of the terminal device and history call information of the terminal device. The client usage information of the terminal device includes usage information of any client installed in the terminal device. The history call information of the terminal device at least includes a calling record, a called record, and call duration and times corresponding to each phone number.

It should be noted that, before obtaining the usage information of the terminal device, the call processing method provided by the present disclosure further includes: detecting whether a first interception function is in an opening state; detecting whether a second interception function is in an opening state when the first interception function is in the opening state; and triggering the process of obtaining the usage information of the terminal device when the second intercept function is in the opening state.

The first interception function may be a strange number interception function, or may be an all-number interception function, or any other call interception function that may result in missing necessary calls. The second interception function is a call interception function for optimizing the first interception function according to the usage information of the terminal device and based on achieving the first interception function, with the purpose of avoiding missing necessary calls.

In step 202, it is determined whether the usage information includes usage information associated with the strange call. If the usage information includes the usage information associated with the strange call, step 203 is executed, and if the usage information does not include the usage information associated with the strange call, step 204 is executed.

When the call request from the strange call is received, the phone number of the strange call is obtained, and according to the phone number and the definition for the usage information of the terminal device in step 201, whether the usage information of the terminal device includes the usage information associated with the strange call may be determined in the following two methods:

Method One: it is determined whether the client usage information of the terminal device includes user trading information on a specified client, in which the user trading information is newly added within a first preset period.

When the user conducts transactions in the specified client, a call request from a strange number may be received in a first preset period after the transaction. If the strange number interception or the all-number interception in the terminal device is in the opening state, the call may be missed, which may not satisfy the communication demand of the user. The specified client herein refers to online commercial platforms, such as Taxi Application, Take-out Application and Ticket Buying Application.

For example, when the user submits one order via the Take-out Application installed in the terminal device, the deliveryman will send a call request to the terminal device in two hours, for notifying the user of the take-out food's delivery situation.

It should be noted that, the first preset period may be determined as follows: The history trading information of the specified client is obtained (the history trading information at least including the delivery time information), and the value corresponding to the longest delivery time is determined as the first preset period. The above method for determining the first preset period may avoid missing necessary strange call to a maximum extent. Certainly, the first preset period may be determined in other methods, which shall not be limited herein.

Method Two: it is determined whether the history call information of the terminal device comprises a specified call record associated with the strange call, in which the specified call record includes a calling record, a called record having a number of calls exceeding a preset number or a call record having call duration exceeding preset duration.

The specified call record associated with the strange call is obtained from the history call information of the terminal device according to the phone number of the strange call.

When the specified call record satisfies any one of following conditions, it is determined that the usage information includes the usage information associated with the stranger call.

First condition: the call history of the strange number includes a calling record, that is, the terminal device has called the phone number of the strange call, but the user does not store the phone number into the address book.

Second condition: in the call history of the strange number, the number of calls between the terminal device and the strange number exceeds the preset number. The preset number may be determined as follows: the number of calls from each strange number is obtained from the history call information, and then the average number of calls is obtained and determined as the preset number. The preset number may be determined as any fixed value, which shall not be limited herein.

Third condition: in the call history of the strange number, the call duration of a call between the terminal device and the strange number exceeds the preset duration. The preset duration may be determined as follows: The call duration of each stranger call is obtained from the history call information, and then average call duration is calculated and determined as the preset duration. The preset duration may also be any fixed value, which shall not be limited herein.

For the above three conditions, it is determined whether the usage information includes the usage information associated with the strange call according to the specified call record associated with the strange call. When the calling record has the phone number of the strange call, it may be determined that the user of the terminal device has voluntarily contacted the user corresponding to the strange call, and may be further determined that the strange call is a call desired or needed by the user of the terminal device. Similarly, in the called record, when the call duration between the user of the terminal device and the user corresponding to the strange call exceeds the preset duration, or the number of calls between the user of the terminal device and the user corresponding to the stranger call exceeds the preset number, it may also be determined that the stranger call is desired or needed by the user.

In another embodiment of the present disclosure, the phone numbers corresponding to the strange calls, which have the number of calls exceeding the preset number as well as call duration exceeding the preset duration, are stored in a specified database. When a call request from a strange number is received, it is determined whether the specified database stores the phone number of the strange call. If the specified database stores the phone number of the strange call, step 203 is executed, and if the specified database does not store the phone number of the strange call, step 204 is executed.

It should be noted that, the strange phone numbers stored in the specified database may be updated according to a preset cycle, so as to save storage space of the specified database and reduce determining time. The preset cycle may be three months or half a year, or may be determined according to the frequency of receiving strange calls, or may be determined in other methods, which shall not be limited herein.

Whether the usage information includes the usage information associated with the strange call may be determined in either or both of above methods. For example, when the user frequently performs virtual trading via the specified client installed in the terminal device, only the first way may be adopted for determining. When the user of the terminal device frequently receives the call requests from stranger numbers, only the second way may be adopted for determining. Thus, the call processing efficiency may be enhanced. However, when both of the above methods are adopted, it is possible to efficiently avoid missing necessary strange calls.

In step 203, the strange call is not intercepted if the usage information includes the usage information associated with the strange call.

If the determining result of step 202 is that the usage information includes the usage information associated with the strange call, a reminder message for the strange call is displayed on the terminal device interface, for notifying the user of prompt processing. In order to block interruptions to the user from unnecessary strange calls efficiently on the premise of ensuring that necessary strange calls are not missed, the call processing method provided by the present disclosure may include: not intercepting the strange call within a second preset period if the usage information includes the usage information associated with the strange call.

For example, when the user performs virtual trading via the Take-out Application installed in the terminal device, the occurrence time of the virtual trading is obtained, and if the second preset period is two hours, then timekeeping is started from the occurrence time, and the call request from the strange number is not intercepted during the timekeeping.

The second preset period may be determined according to the type of the specified client, or may be determined according to the delivery distance or delivery time of the history orders, which shall not be limited herein.

In another embodiment of the present disclosure, when an opening or closing operation is detected on any specified client, the usage information of the specified client is obtained. When users' trading information on the specified client is detected, the following two methods may be adopted to display the reminder message on the terminal device, so as to avoid missing necessary strange calls due to the fact that the second interception function of the terminal device is not in the opening state.

Method One: it is detected whether the first interception function is in the opening state, and a first reminder message is displayed on a current interface of the terminal device if the first interception function is in the opening state, in which the first reminder message reminds of whether to close the first interception function.

Method Two: it is detected whether the first interception function is in the opening state, a second reminder message is displayed on the current interface of the terminal device if the first interception function is in the opening state, in which the second reminder message reminds of whether to open the second interception function, and after the second interception function is started, the first interception function is controlled not to intercept the strange call.

With the above two methods, the problem of missing necessary strange calls caused by forgetting to start the second interception function after starting the first interception function may be avoided efficiently. Certainly, the user may be reminded of in other methods, which shall not be limited herein.

In step 204, the strange call is intercepted if the usage information does not include the usage information associated with the strange call.

The strange call may be intercepted in following two methods:

Method One: intercepting and reminding. That is, the strange call is hung up automatically, and a reminder message for the strange call is displayed on the terminal device interface. The reminder message for the strange call may include the call time and the phone number, etc. Alternatively, the strange call may be put through automatically and a specified voice message is played. The call may be hung up after the voice message is played once, or the voice message may be played in a continuous loop until the user corresponding to the strange call hangs up the phone. The specified voice message may be customized by the user, or may be inherent in the system, which shall not be limited herein.

Method Two: only intercept but not reminder. After the stranger call is hung up automatically or put through and then hung up automatically, the reminder message for the stranger call is not displayed on the terminal device interface, but the intercepted phone number and the intercept time may be stored in the intercept history database, for checking by the user.

In another embodiment of the present disclosure, in order to further avoid missing necessary strange calls, the phone number of the strange call and the interception times may be stored, such that the strange call may not be intercepted when the call request from the strange call is received again.

With the methods provided by the present disclosure, by determining whether the usage information of the terminal device includes user trading information on a specified client or a specified call record associated with the strange call, whether the strange call is desired or needed by the user of the terminal device may be determined. Then, the control on intercepting the strange call may be realized, thereby avoiding missed calls efficiently, further improving the communication efficiency, and satisfying the normal communication demand of the user. Moreover, when the usage information includes the usage information associated with the strange call, the duration of interception is controlled by the second preset duration, such that the call processing method may reduce interruptions to the user efficiently on the premise of avoiding missed calls.

Figure 3:
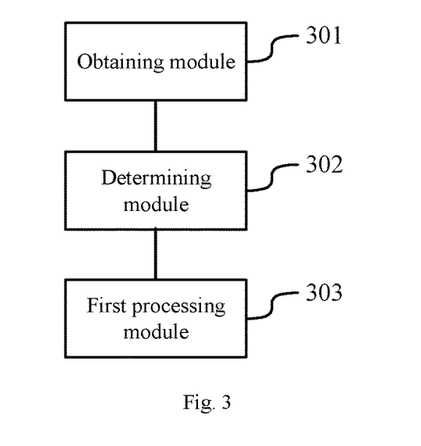
FIG. 3 is a block diagram of a call processing device according to an exemplary embodiment of the present disclosure.

FIG. 3 is a block diagram of a call processing device according to an exemplary embodiment of the present disclosure. As illustrated in FIG. 3, the device includes an obtaining module 301, a determining module 302 and a first processing module 303.

The obtaining module 301 is configured to obtain usage information of a terminal device when a call request is received from a strange number.

The determining module 302 is configured to determine whether the usage information obtained by the obtaining module 301 includes usage information associated with the strange call.

The first processing module 303 is configured not to intercept the strange call if the determining module 302 determines that the usage information includes the usage information associated with the strange call.

In a first possible implementation of the present disclosure, the determining module 302 is configured to: determine whether client usage information of the terminal device obtained by the obtaining module 301 includes user trading information on a specified client, in which the user trading information is newly added within a first preset period; or determine whether history call information of the terminal device obtained by the obtaining module 301 includes a specified call record associated with the strange call, in which the specified call record comprises a calling record, a called record having a number of calls exceeding a preset number or a call record having call duration exceeding preset duration.

In a second possible implementation of the present disclosure, the first processing module 301 is configured not to intercept the strange call within a second preset period, if the determining module 302 determines that the usage information comprises the usage information associated with the strange call.

In a third possible implementation of the present disclosure, the device further includes: a detecting module is configured to detect whether a first interception function is in an opening state, and to detect whether a second interception function is in an opening state if the first interception function is in the opening state; and a second processing module is configured to trigger the process of obtaining the usage information of the terminal device, if the detecting module detects that the second interception function is in the opening state.

In a fourth possible implementation of the present disclosure, the first processing module 303 is configured to: detect whether a first interception function is in an opening state, and display a first reminder message of whether to close the first interception function on a current interface of the terminal device if the first interception function is in the opening state; or detect whether a first interception function is in an opening state, display a second reminder message of whether to start a second interception function on the current interface of the terminal device if the first interception function is in the opening state, and control the first interception function not to intercept the strange call after starting the second interception function.

With respect to the devices in the above embodiments, the specific operation modes of individual modules therein have been described in detail in the embodiments regarding the call processing methods, which will not be elaborated herein.

Figure 4:
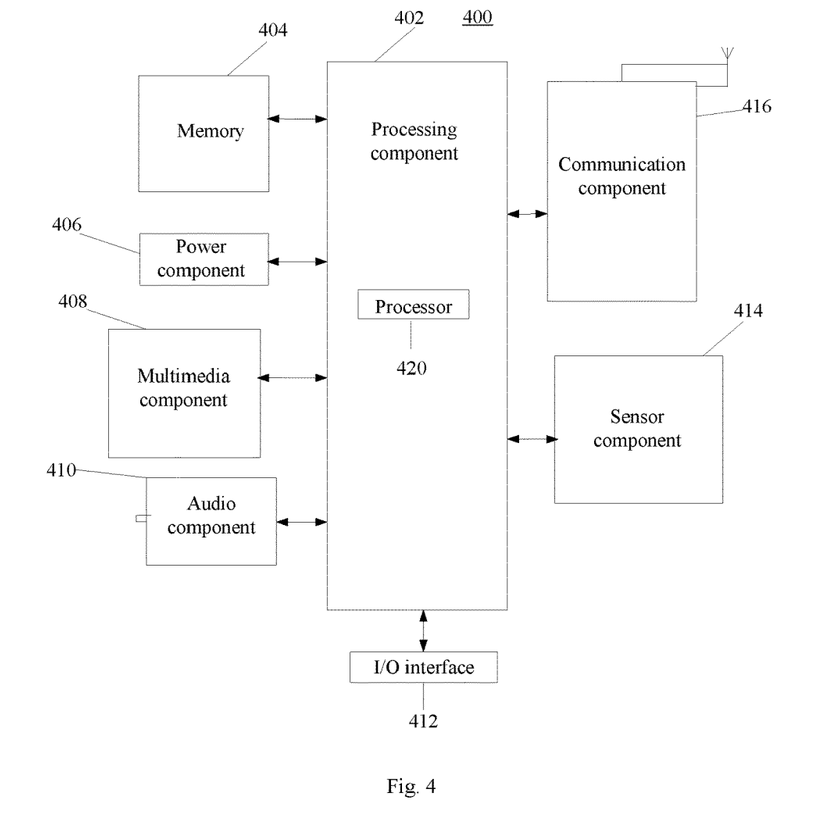
FIG. 4 is a block diagram of a call processing device 400 according to an exemplary embodiment of the present disclosure.

FIG. 4 is a block diagram of a call processing device 400 according to exemplary embodiments of the present disclosure. For example, the device 400 may be a mobile phone, a computer, a digital broadcasting terminal device, a messaging device, a game console, a tablet device, a fitness equipment, a medical device, a Personal Digital Assistant PDA, etc.

Referring to FIG. 4, the device 400 may include the following one or more components: a processing component 402, a memory 404, a power component 406, a multimedia component 408, an audio component 410, an Input/Output (I/O) interface 412, a sensor component 414, and a communication component 416.

The processing component 402 typically controls overall operations of the device 400, such as the operations associated with display, telephone calls, data communications, camera operations, and recording operations. The processing component 402 may include one or more processors 1220 to execute instructions to perform all or part of the steps in the above described methods. Moreover, the processing component 402 may include one or more modules which facilitate the interaction between the processing component 402 and other components. For instance, the processing component 402 may include a multimedia module to facilitate the interaction between the multimedia component 408 and the processing component 402.

The memory 404 is configured to store various types of data to support the operation of the device 400. Examples of such data include instructions for any applications or methods operated on the device 400, contact data, phonebook data, messages, pictures, video, etc. The memory 404 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 406 provides power to various components of the device 400. The power component 406 may include a power management system, one or more power sources, and any other components associated with the generation, management, and distribution of power in the device 400.

The multimedia component 408 includes a screen providing an output interface between the device 400 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and other gestures on the touch panel. The touch sensors may not only sense a boundary of a touch or swipe action, but also sense a duration time and a pressure associated with the touch or swipe action. In some embodiments, the multimedia component 408 includes a front camera and/or a rear camera. The front camera and/or the rear camera may receive external multimedia data while the device 400 is in an operation mode, such as a photographing mode or a video mode. Each of the front camera and the rear camera may be a fixed optical lens system or have focus and optical zoom capability.

The audio component 410 is configured to output and/or input audio signals. For example, the audio component 410 includes a microphone (MIC) configured to receive an external audio signal when the device 400 is in an operation mode, such as a call mode, a recording mode, and a voice recognition mode. The received audio signal may be further stored in the memory 404 or transmitted via the communication component 416. In some embodiments, the audio component 410 further includes a speaker to output audio signals.

The I/O interface 412 provides an interface for the processing component 402 and peripheral interface modules, such as a keyboard, a click wheel, buttons, and the like. The buttons may include, but are not limited to, a home button, a volume button, a starting button, and a locking button.

The sensor component 414 includes one or more sensors to provide status assessments of various aspects of the device 400. For instance, the sensor component 414 may detect an open/closed status of the device 400 and relative positioning of components (e.g. the display and the keypad of the device 400). The sensor component 414 may also detect a change in position of the device 400 or of a component in the device 400, a presence or absence of user contact with the device 400, an orientation or an acceleration/deceleration of the device 400, and a change in temperature of the device 400. The sensor component 414 may include a proximity sensor configured to detect the presence of nearby objects without any physical contact. The sensor component 414 may also include a light sensor, such as a CMOS or CCD image sensor, for use in imaging applications. In some embodiments, the sensor component 414 may also include an accelerometer sensor, a gyroscope sensor, a magnetic sensor, a pressure sensor, or a temperature sensor.

The communication component 416 is configured to facilitate wired or wireless communication between the device 400 and other devices. The device 400 can access a wireless network based on a communication standard, such as WIFI, 2G or 3G or a combination thereof. In one exemplary embodiment, the communication component 416 receives a broadcast signal or broadcast associated information from an external broadcast management system via a broadcast channel. In one exemplary embodiment, the communication component 416 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary embodiments, the device 400 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary embodiments, there is also provided a non-transitory computer readable storage medium including instructions, such as the memory 404 including instructions. The above instructions are executable by the processor 420 in the device 400, for performing the above-described methods. For example, the non-transitory computer-readable storage medium may be a ROM, a RAM, a CD-ROM, a magnetic tape, a floppy disc, an optical data storage device, and the like.

In exemplary embodiments, there is also provided a non-transitory computer readable storage medium, when instructions in the storage medium are executed by a processor in a mobile terminal device, the mobile terminal device may execute the above call processing method.

Other embodiments of the invention will be apparent to those skilled in the art from consideration of the specification and practice of the invention disclosed here. This application is intended to cover any variations, uses, or adaptations of the invention following the general principles thereof and including such departures from the present disclosure as come within known or customary practice in the art. It is intended that the specification and examples be considered as exemplary only, with a true scope and spirit of the invention being indicated by the following claims.

It will be appreciated that the present invention is not limited to the exact construction that has been described above and illustrated in the accompanying drawings, and that various modifications and changes can be made without departing form the scope thereof. It is intended that the scope of the invention only be limited by the appended claims.

What is claimed is:

1. A call processing method, implemented in a terminal device, comprising:
    detecting whether a first intercept function is in an opening state, wherein the first intercept function is configured to intercept a strange call, and the strange call is a call from a phone number not stored in an address book of the terminal device;

detecting whether a second intercept function is in an opening state when the first intercept function is in the opening state; and performing the second intercept function when the second intercept function is in the opening state, wherein performing the second intercept function comprises:

obtaining a call request from the strange call intercepted by the first intercept function:

obtaining usage information of the terminal device when receiving the call request from the intercepted strange call;

determining whether the usage information comprises usage information associated with the intercepted strange call; and controlling the first intercept function not to intercept the intercepted strange call if the usage information comprises the usage information associated with the intercepted strange call.

2. The method according to claim 1, wherein determining whether the usage information comprises usage information associated with the intercepted strange call comprises:

determining whether client usage information of the terminal device comprises user trading information on a specified client, in which the user trading information is newly added within a first preset period.

3. The method according to claim 1, wherein determining whether the usage information comprises usage information associated with the intercepted strange call comprises:

determining whether history call information of the terminal device comprises a specified call record associated with the intercepted strange call, in which the specified call record comprises a calling record, a called record having a number of calls greater than a preset number or a call record having a call duration greater than a preset duration.

4. The method according to claim 1, wherein controlling the first intercept function not to intercept the intercepted strange call if the usage information comprises the usage information associated with the intercepted strange call comprises:

controlling the first intercept function not to intercept the intercepted strange call within a second preset period, if the usage information comprises the usage information associated with the intercepted strange call.

5. The method according to claim 1, wherein controlling the first intercept function not to intercept the intercepted strange call comprises:

displaying a first reminder message on a current interface of the terminal device if the first intercept function is in the opening state, the first reminder message reminding of whether to close the first intercept function.

6. A call processing device, comprising:
a processor; and
a memory, configured to store instructions executable by the processor,
wherein the processor is configured to:
detect whether a first intercept function is in an opening state, wherein the first intercept function is configured to intercept a strange call, and the strange call is a call from a phone number not stored in an address book of the terminal device;
detect whether a second intercept function is in an opening state when the first intercept function is in the opening state; and
perform the second intercept function when the second intercept function is in the opening state, wherein, in order to perform the second intercept function, the processor is further configured to:

obtain a call request from the strange call intercepted by the first intercept function:

obtain usage information of a terminal device when receiving the call request from the intercepted strange call;

determine whether the usage information comprises usage information associated with the intercepted strange call; and control the first intercept function not to intercept the intercepted strange call if the usage information comprises the usage information associated with the intercepted strange call.

7. The device according to claim 6, wherein the processor determines whether the usage information comprises usage information associated with the intercepted strange call by:

determining whether client usage information of the terminal device comprises user trading information on a specified client, in which the user trading information is newly added within a first preset period.

8. The device according to claim 6, wherein the processor determines whether the usage information comprises usage information associated with the intercepted strange call by:

determining whether history call information of the terminal device comprises a specified call record associated with the intercepted strange call, in which the specified call record comprises a calling record, a called record having a number of calls greater than a preset number or a call record having a call duration greater than a preset duration.

9. The device according to claim 6, wherein the processor controls the first intercept function not to intercept the intercepted strange call if the usage information comprises the usage information associated with the intercepted strange call by:

controlling the first intercept function not to intercept the intercepted strange call within a second preset period, if the usage information comprises the usage information associated with the intercepted strange call.

10. The device according to claim 6, wherein the processor controls the first intercept function not to intercept the intercepted strange call by:

displaying a first reminder message on a current interface of the terminal device if the first intercept function is in the opening state, the first reminder message reminding of whether to close the first intercept function.

11. A non-transitory computer-readable storage medium having stored therein instructions that, when executed by a processor of a terminal device, causes the terminal device to perform a call processing method, the method comprising:

detecting whether a first intercept function is in an opening state, wherein the first intercept function is configured to intercept a strange call, and the strange call is a call from a phone number not stored in an address book of the terminal device;

detecting whether a second intercept function is in an opening state when the first intercept function is in the opening state; and performing the second intercept function when the second intercept function is in the opening state, wherein performing the second intercept function comprises:

obtaining a call request from the strange call intercepted by the first intercept function:

obtaining usage information of the terminal device when receiving the call request from the intercepted strange call;

determining whether the usage information comprises usage information associated with the intercepted strange call; and controlling the first intercept function not to intercept the intercepted strange call if the usage information comprises the usage information associated with the intercepted strange call.

12. The non-transitory computer-readable storage medium according to claim 11, wherein determining whether the usage information comprises usage information associated with the intercepted strange call comprises:

determining whether client usage information of the terminal device comprises user trading information on a specified client, in which the user trading information is newly added within a first preset period.

13. The non-transitory computer-readable storage medium according to claim 11, wherein determining whether the usage information comprises usage information associated with the intercepted strange call comprises:

determining whether history call information of the terminal device comprises a specified call record associated with the intercepted strange call, in which the specified call record comprises a calling record, a called record having a number of calls greater than a preset number or a call record having a call duration greater than a preset duration.

14. The non-transitory computer-readable storage medium according to claim 11, wherein controlling the first intercept function not to intercept the intercepted strange call if the usage information comprises the usage information associated with the intercepted strange call comprises:

controlling the first intercept function not to intercept the intercepted strange call within a second preset period, if the usage information comprises the usage information associated with the intercepted strange call.

15. The non-transitory computer-readable storage medium according to claim 11, wherein controlling the first intercept function not to intercept the intercepted strange call comprises:

displaying a first reminder message on a current interface of the terminal device if the first intercept function is in the opening state, the first reminder message reminding of whether to close the first intercept function.

* * * * *